United States Patent [19]

Hover

[11] Patent Number: 4,785,547

[45] Date of Patent: Nov. 22, 1988

[54] APPARATUS FOR FORMING A LENS PATTERN

[76] Inventor: Floyd Hover, 116 Hacklebarney, Long Valley, N.J. 07853

[21] Appl. No.: 21,792

[22] Filed: Mar. 4, 1987

[51] Int. Cl.$^4$ ............................. G01B 5/00; A61B 3/10
[52] U.S. Cl. ...................................................... 33/507
[58] Field of Search ............................ 33/507, 28, 200

[56] References Cited

U.S. PATENT DOCUMENTS

| | | |
|---|---|---|
| 1,117,264 | 11/1914 | Skinner . |
| 2,872,738 | 2/1959 | Rogers . |
| 2,878,567 | 3/1959 | Hofman et al. . |
| 3,145,417 | 8/1964 | Shatzel . |
| 3,228,070 | 1/1966 | Gill . |
| 3,313,031 | 4/1967 | Lowe . |
| 3,457,652 | 7/1969 | Moffett . |
| 3,459,085 | 8/1969 | Takubo . |
| 3,924,936 | 12/1975 | Clark . |
| 4,625,418 | 12/1986 | Joncour et al. ................... 33/507 X |
| 4,646,445 | 3/1987 | Wehmeier ............................ 33/507 |

FOREIGN PATENT DOCUMENTS 1051677  2/1959  Fed. Rep. of Germany .......... 33/28

Primary Examiner—Harry N. Haroian
Attorney, Agent, or Firm—Thomas L. Adams

[57] ABSTRACT

Apparatus for forming a lens pattern for an eyeglass frame includes a guide and a slider mounted on a base. The slider can slide longitudinally on the base. Also included is a mounting device for detachably holding the pattern on the slider. The guide is mounted on the base transversely to the slider. A clamp is included for holding the eyeglass frame against the guide in a continously adjustable position. Thus the pattern and eyeglass frame are relatively movable in two dimensions.

7 Claims, 1 Drawing Sheet

APPARATUS FOR FORMING A LENS PATTERN

BACKGROUND OF THE INVENTION

The present invention relates to apparatus for forming a lens pattern and in particular to a fixture for moving a pattern and eyeglass frame relatively in two dimensions.

A known lens former has a base with a wall against which an eyeglass frame can be placed. A lens pattern is placed underneath the eyeglass frame and a scribing tool is used to trace the outline of the opening of the eyeglass frame. Thereafter, the lens pattern can be cut to the scribed size matching the opening of the eyeglass frame. Once so cut, the pattern can be placed in an edging machine which can be used to grind the edge of the lens so its outline matches that of the lens pattern and the opening in the eyeglass frame. A disadvantage with this equipment is that there is no convenient way of centering the lens pattern within the eyeglass frame. If the pattern and the eyeglass frame both rest against the wall on the base, it will be difficult to center the pattern.

It is also known to place an eyeglass frame on a base having two perpendicularly movable walls. These walls can be used to move the eyeglass frame in two dimensions and thereby place it in a desired position over a predetermined position on the base. Fixtures of this type have been used, however, to mold a lens pattern rather than scribe an outline on a pattern. Accordingly, this technique requires elaborate procedures for establishing a form and casting a pattern. In addition, the procedure of moving a wall adds inaccuracies since a relatively long wall needs to be moved without changing its angular relationship with respect to the other movable wall.

Accordingly, there is a need for an improved apparatus for forming a lens pattern which enables the eyeglass frame and lens pattern to be moved relatively in two dimensions while keeping an accurately fixed angular relationship among the components.

SUMMARY OF INVENTION

In accordance with the illustrative embodiments demonstrating features and advantages of the present invention, there is provided apparatus for forming a lens pattern for an eyeglass frame. The apparatus includes a base and a slider mounted on the base for sliding longitudinally thereon. Also included is a mounting means for detachably holding the pattern on the slider. A guide is mounted on the base transversely to the slider. The apparatus includes clamping means for holding the eyeglass frame against the guide in a continuously adjustable position. Thus, the pattern and eyeglass frame are relatively movable in two dimensions. A method employing the same principles of the same invention can form a pattern for a lens for an eyeglass frame by using a guide and a slider. The method includes a step of mounting the pattern atop the slider. Another step is placing the eyeglass frame over the pattern and against the guide. The method further includes the step of moving the frame laterally along the guide and moving the slider transversely thereto to center the pattern in the eyeglass frame.

By employing apparatus and methods of the foregoing type an improved way of forming a lens pattern is acheived. In a preferred embodiment, a wall is mounted in a base transversely to an embedded slider. The slider carries a lens pattern transversely to the wall. The wall is arched to allow the pattern to slide under the wall. This provides clearance to allow the large amount of movement of the pattern. A base of this type will allow the eyeglass frame to move laterally while the lens pattern can move perpendicularly thereto. This allows the centering of the lens pattern at the opening of the eyeglass frame.

Preferably, the base has a spring-biased holding arm that may be pivoted onto eyeglass frames to keep them stationary while they are being used as a templet for scribing the lens pattern. The preferred holder is a cylindrical post onto which a curved arm is pinned. The arm can turn asmotably and in elevation. The arm is spring-biased by connecting between it and the base a spring. It is also preferred to have the slider in the form of a bar having a trapezoidal cross-section and slidably mounted in a channel formed in the base. The fitting is such as to produce a dove-tail joint.

BRIEF DESCRIPTION OF THE DRAWING

The above brief description as well as other features and advantages of the present invention will be more fully appreciated by reference to the following detailed description of a presently preferred, but nonetheless illustrative, embodiment of the present invention when taken in conjunction with the accompanying drawings, wherein:

Referring to FIGS. 1 and 2, base 10 is a lucite slab dimensioned around twelve inches by eight inches by one inch. It will be appreciated, however, that base 10 can be made of other plastic materials or of metal, wood, or other suitable substances. Base 10 has a rectangular slot 12 running the length of base 10 parallel to and relatively close to one edge thereof. Slot 12 is sized to fit a guide-wall 14 which is approximately two inches tall and one-half inch thick. The wall may be formed of the same material as base 10. Guide-wall 14 has in it an arch 16 in the form of a rectangular cutout along the bottom edge of guide wall 14. While a rectangular cutout is shown, it will be appreciated that semi-circular, semi-oval, and other shapes of arches are possible. Wall 14 may be secured to base 10 by screws or other fasteners but it is preferred that the wall be held in place by a contact cement. The base 10 has cut into it a trapezoidal channel 18 forming part of a dove-tail joint. The channel 18 runs the width of base 10 but in some embodiments may run in the order of half the width of the base. As will be disclosed here and after, the groove 18 must have a length sufficient to allow adequate movement of the lens pattern described presently.

Figure 3:
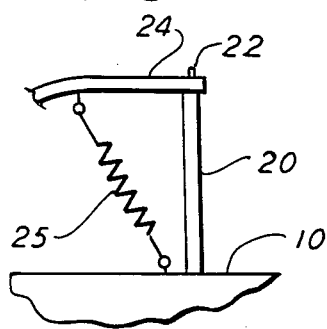
FIG. 3 is an elevational view of the clamping means of FIG. 1.

A clamping means is shown herein as post 20, a lucite dowel secured to base 10 by being affixed by glue, or otherwise, to a matching hole in the base. The top of post 20 has embedded in it a pin 22 (FIG. 3) which acts as a joint to support arm 24. Arm 24 may be a lucite rod having an S-like curve in it so that it may run approximately horizontally from the top of post 20 and reach a lower horizontal position parallel to base 10. While arm 24 and post 20 are preferably lucite rods, it will be appreciated that other materials can be used as well. The arm 24 is held on pin 22 and biased downwardly by a yielding means known herein as helical spring 26 attached between the lower side of arm 24 near pin 22 and base 10 near its juncture with post 20. The pin 22 fits in a hole in arm 24 having sufficient clearance that the arm can rotate about one hundred eighty degrees (limited by spring 26) and can be lifted several inches from base 10. It will be understood that various clamps can be used in place of the clamping means 20, 24. For instance, spring-biased tabs and threaded clamps can be used for the purposes to be described presently. Also in some embodiments, arm 24 may be spring steel which is itself a yielding means so that it is biased downwardly to provide a holding force.

It will be noted that channel 18 and slot 12 intersect at the middle of arch 16.

A slider 26 is shown as a bar having a trapezoidal cross-section sized to match that of channel effectively forms a dove-tail joint such that the upper surface of slider 26 is flush with the top of base 10. The slider 26 has atop it a mounting means in the form of a spaced pair of pins 28 aligned transversely to the length of slider 26. Pins 28 are sized so that they do not interfere with wall 14 and fit under arch 16. Pins 28 are designed to meet with matching holes in a lens pattern 30. Lens pattern 30 is a commercially available templet conventionally used for forming a pattern matching the opening in an eyeglass frame.

Figure 1:
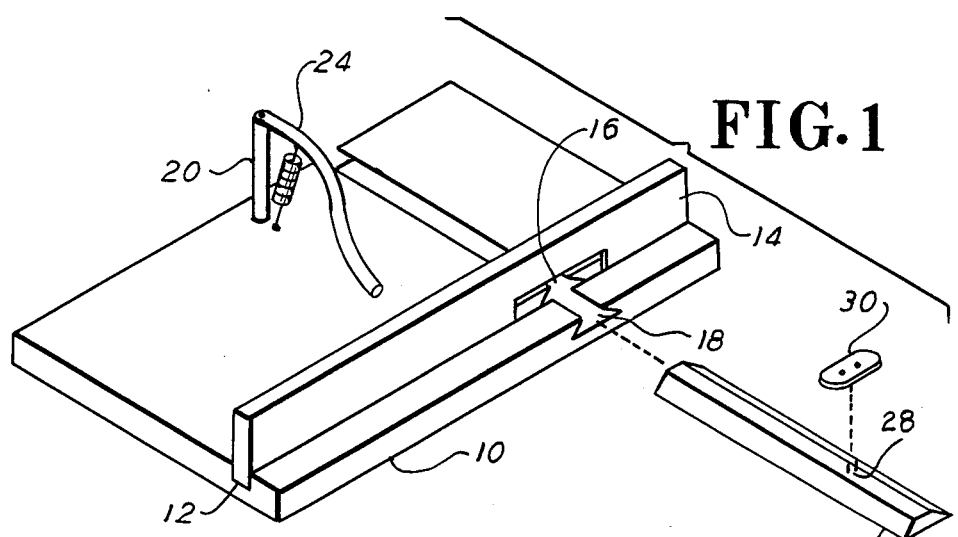
FIG. 1 is perspective view of an apparatus forming a lens pattern in accordance with the principles of the present invention.
Figure 2:
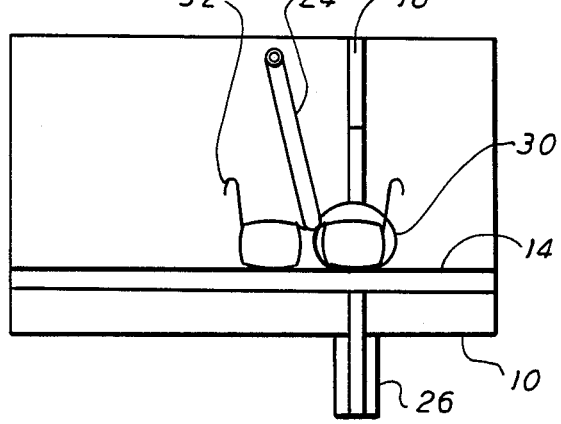
FIG. 2 is a plan view of the apparatus of FIG. 1.

As shown most clearly in FIG. 2, the pattern 30 can be held in place by resting on the slider 26. By moving slider 26 in and out, the pattern 30 can be moved toward and away from wall 14. As shown in FIG. 2, the pattern 30 can move under wall 14 thereby allowing a high latitude of movement for lens pattern 30. Also in FIG. 2, an eyeglass frame 32 is shown lying atop the lens pattern 30. Arm 24 of the clamping means is shown resting on the bridge of the eyeglass frame to hold it in place against and parallel to wall 14. It will be appreciated that frame 32 can be moved laterally (left to right in this view) along wall 14 and arm 24 can be easily adjusted to accomplish this lateral translation.

Figure 4B:
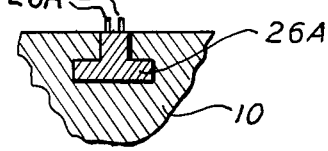
FIG. 4A is a cross-sectional view.

It will be appreciated that slider 26 in channel 18 can take alternate shapes. For example in FIG. 4B, a slider 26A is shown having an inverted T-shape which matches an equivalent channel in base 10. Other shapes are contemplated as well.

Figure 4A:
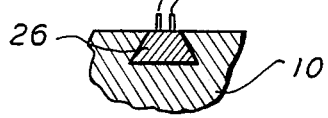

To facilitate an understanding of the principles associated with the foregoing apparatus, its operation will now briefly be described. The base 10 is assembled with the slider approximately as shown in FIG. 2. Next, a lens pattern 30 is placed atop pins 28 (FIG. 4A). Because a pair of pins is used, the major axis of lens pattern 30 is held parallel to wall 14. Thereafter, the eyeglass frame is placed in position touching and parallel to wall 14. Because the frame 32 rests against the wall 14, its positional stability is excellent. It will be understood that an eyeglass frame 32 may be new and, therefore, would not have an eyeglass in it. The empty eyeglass frame 32 is positioned to have one of its openings centered along the axis of channel 18. Notice the convenience of handling only a one-dimensional adjustment of eyeglass frame 32. It is not necessary to perform any difficult adjustments in two dimensions since the freedom of motion of eyeglass frame 32 is restricted. Once the eyeglass frame 32 is in position, the arm 24 can be placed as shown across the bridge of eyeglass frame 32. It will be noted that arm 24 allows, however, simple adjustment in that the frame 32 can, with modest force, be readjusted laterally to ensure proper centering.

The lens pattern 30 may now be adjusted by manipulating slider 26. Because the eyeglass frame 32 has already been centered along one axis with respect to channel 18, the lens pattern 30 need now only be adjusted in one dimension. This is again another simplification of the adjustment process. The slider 26 is moved to a position wherein the lens pattern 30 now has its center in the center of the opening of eyeglass frame 32.

Once so centered, the operator can now take a scribing tool and etch the outline of the opening of the eyeglass frame onto lens pattern 30 in the usual fashion. At this point, the lens pattern 30 can be removed and cut by shears or appropriate equipment so that its outline is that previously scribed.

The lens pattern is now set into an edging machine of a known type. The edging machine, in general, will use the lens pattern 30 as described to guide a grinding wheel to cut a lens blank so that it has the same outline as the lens pattern. As is well-known, the lens is prepared by marking its optical center with a lensometer and then adhesively attaching blocks to the lens with a blocker. This mechanically defines the optical center of the lens so that it can be properly set into the edging machine. Any offsets desired on the optical center of the lens can be achieved either through the offsetting of the blocks or, if possible, by adjustment on the edging machine.

It will be appreciated that the same process can be performed for the other opening in the eyeglass frame 32. Once both eyeglasses are cut, they can be secured into the eyeglass frame in the usual manner.

It is to be appreciated that various modifications may be implemented with respect to the above-described preferred embodiments. For example, the base need not be rectangular but may have a circular, triangular, or other convenient plan. Furthermore, the wall need not be a separate wall but can be a molded, raised section of a base. The base may have an L-shaped side-elevational view. Also, the opening of the arch can be sized and shaped in various ways although it is preferred to minimize the size of the arch to provide maximum stability for the eyeglass frame that may rest near arch. It will also be understood that while one clamp is shown, more than one can be employed. Additionally, the position of the clamp can be adjustable to accommodate various sized eyeglass frames. Also, while the eyeglass frames are shown with their temples positioned away from the wall, the invention may be practiced with the frame the other way. Also, the method can be practiced in various orders so that lateral adjustment of the frame can occur before or after the adjustment of the position of the lens pattern. Furthermore, the clamp can be placed into position at any point in the performance of the process provided it is used before the scribing of the lens pattern. It will be further understood that the size, shape, proportion, and materials used in the apparatus described herein can be varied depending upon the desired size, stability, structural integrity, temperature stability, and tolerance desired for the finished product.

Obviously, many modifications and variations of the present invention are possible in light of the above teachings. It is, therefore, to be understood that within the scope of the appended claims, the invention may be practiced otherwise than as specifically described.

What is claimed is:

1. Apparatus for forming a lens pattern for an eyeglass frame, comprising:
   a base having a channel;
   a slider mounted on said base for sliding longitudinally thereon, said channel being sized to receive said slider;
   mounting means for detachably holding said pattern on said slider;
   a guide mounted on said base transversely to said slider, said guide comprising a wall mounted on said base perpendicularly to said channel, said wall having an arch over said channel sized to provide clearance for said lens pattern; and
   clamping means for holding said eyeglass frame against said guide in a continuously adjustable position, whereby said pattern and eyeglass frame are relatively moveable in two dimensions.

2. Apparatus according to claim 1 wherein said slider has a trapezoidal cross-section to form a dovetail joint with said base.

3. Apparatus according to claim 2 wherein said mounting means comprises:
   at least one pin mounted upright on said slider.

4. Apparatus according to claim 3 wherein said clamping means comprises:
   a post mounted on said base;
   an arm mounted atop said post to articulate thereon; and
   yielding means for urging said arm downwardly.

5. Apparatus according to claim 4 wherein said yielding means comprises a spring.

6. Apparatus according to claim 5 wherein said arm is downwardly curved.

7. Apparatus according to claim 6 wherein said base has a slot, said wall being mounted in said slot, said arch being sized to provide a space between the top of said slot and the top of said arch.

* * * * *